United States Patent
Aboulnaga

(10) Patent No.: US 8,471,498 B2
(45) Date of Patent: Jun. 25, 2013

(54) ILLUMINATION DEVICE WITH ELECTRICAL VARIABLE SCATTERING ELEMENT

(75) Inventor: Aly Aboulnaga, Des Plaines, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 288 days.

(21) Appl. No.: 13/120,174

(22) PCT Filed: Sep. 14, 2009

(86) PCT No.: PCT/IB2009/054011
§ 371 (c)(1),
(2), (4) Date: Mar. 22, 2011

(87) PCT Pub. No.: WO2010/035168
PCT Pub. Date: Apr. 1, 2010

(65) Prior Publication Data
US 2011/0169424 A1    Jul. 14, 2011

Related U.S. Application Data

(60) Provisional application No. 61/099,288, filed on Sep. 23, 2008.

(51) Int. Cl.
*H05B 37/02*    (2006.01)

(52) U.S. Cl.
USPC ......... 315/307; 315/297; 315/185 R; 315/291

(58) Field of Classification Search
USPC ............... 315/82, 185 R, 224, 287, 291, 297, 315/307, 308, 312
See application file for complete search history.

(56) References Cited

U.S. PATENT DOCUMENTS

| | | | |
|---|---|---|---|
| 2,915,693 A | 12/1959 | Harrison | |
| 5,367,424 A | 11/1994 | Even | |
| 6,016,038 A | 1/2000 | Mueller et al. | |
| 6,211,626 B1 | 4/2001 | Lys et al. | |
| 6,836,081 B2 * | 12/2004 | Swanson et al. | 315/307 |
| 7,265,504 B2 * | 9/2007 | Grant | 315/308 |
| 7,265,540 B2 * | 9/2007 | Sudo et al. | 324/207.21 |
| 7,276,861 B1 | 10/2007 | Shteynberg et al. | |
| 7,635,957 B2 * | 12/2009 | Tripathi et al. | 315/309 |
| 7,876,103 B2 * | 1/2011 | Mihai et al. | 324/414 |
| 7,994,725 B2 * | 8/2011 | Bouchard | 315/122 |

(Continued)

FOREIGN PATENT DOCUMENTS

| | | |
|---|---|---|
| WO | 9745905 A1 | 12/1997 |
| WO | 0072435 A1 | 11/2000 |

*Primary Examiner* — Vibol Tan
(74) *Attorney, Agent, or Firm* — Mark L. Beloborodov

(57) ABSTRACT

A current limiting controller (100) for a light emitting diode (LED) driver automatically resets the LED driver to normal operation after elimination of a fault. The current limiting controller (100) includes a fault detector to detect a fault across a load (20, 40) that is being driven by the driver circuit (10, 30); a current limiter (130, 230) to limit the current supplied from the driver circuit (10, 30) to the load (20, 40) in response to the detected fault; and a reset circuit (120, 220, 320) to disable the current limiter (130, 230) upon expiration of a first time interval after the fault is detected, and to allow the current limiter (130, 230) again to limit the current supplied from the driver circuit (10, 30) to the load (20, 40) when the detected fault remains after a second time interval.

18 Claims, 4 Drawing Sheets

U.S. PATENT DOCUMENTS

| | | | |
|---|---|---|---|
| 2002/0140380 A1* | 10/2002 | Biebl | 315/291 |
| 2003/0076079 A1 | 4/2003 | Alcantar et al. | |
| 2003/0112573 A1 | 6/2003 | Perez | |
| 2004/0212942 A1 | 10/2004 | Balakrishnan | |
| 2004/0263139 A1 | 12/2004 | Goto et al. | |
| 2010/0049454 A1* | 2/2010 | Irissou et al. | 702/58 |

* cited by examiner

ILLUMINATION DEVICE WITH ELECTRICAL VARIABLE SCATTERING ELEMENT

TECHNICAL FIELD

The present invention is directed generally to driver circuitry, such as a driver circuit for one or more light emitting diodes (LEDs). More particularly, various inventive methods and apparatus disclosed herein relate to a current limiting controller for automatically resetting an LED driver to normal operation after the elimination of a fault.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Typically, in these fixtures, driver circuitry is provided to controllably supply an operating current to drive one or more LED light sources (collectively referred to as LED load). In many applications, the circuitry includes an LED driver specifically designed to supply a high load current. Such high current LED drivers are being employed extensively to drive LED loads for lighting applications.

In some cases, a short circuit may occur across the LED load. This may happen because of some error in the mechanical assembly of the LED load, a mechanical vibration of the LED assembly causing a short circuit, a defect in the LED load, water leakage into the LED load assembly, high surrounding humidity, or for other reasons. If any of these situations occur, unless additional measures are taken the LED driver will continue to try to deliver the normal full operating current to the LED load. This high current may heat the area where the short circuit exists which, in turn, may cause a variety of different hazards such fire, smoke, explosion, melting of a lighting fixture holding the LED load, or other damage to the LED load or to circuitry connecting the LED driver to the LED load.

To address this problem, it is desirable to detect any kind of short circuit or fault that occurs across the LED load. Furthermore, in the event that such a short circuit or fault occurs, it is desirable to limit the current supplied by the LED driver to the LED load to a lower, safe, value that will not cause the kinds of hazards described above.

However, providing such a current-limiting arrangement presents another problem. In many cases, the cause of the short circuit or fault is only temporary (e.g., in cases of mechanical vibration; humidity; etc.) and after a period of time the short circuit disappears or is eliminated. Nevertheless, even though the short circuit no longer exists and the LED load is capable of normal operation, because the load current supplied to the LED load by the LED driver has been reduced to a low value, the LED load can no longer operate properly.

Thus, there is a need in the art to provide a current limiting controller for a driver circuit for an LED load that can reset the driver to normal operation when a short circuit or fault is eliminated.

SUMMARY

The present disclosure is directed to inventive methods and apparatus for limiting the load current supplied from a driver circuit to a load in the event of a short circuit or fault, and for restoring normal operation of the driver after the short circuit or fault is no longer detected.

Generally, in one aspect, a current limiting controller controls a driver circuit (e.g., an LED driver circuit) supplying a load current to drive a load (e.g., an LED load). The current limiting controller includes a voltage detector to produce a fault detection voltage based on a voltage produced across the load by the driver circuit. The current limiting controller further includes a current limiter to limit the load current supplied from the driver circuit to the load when the fault detection voltage falls below a threshold value, indicating a fault condition. The current limiting controller further includes a reset circuit to disable the current limiter upon expiration of a first time interval after the fault detection voltage falls below the threshold voltage level and thereby allow the driver to supply the normal current again. When the fault detection voltage remains below the threshold voltage, upon expiration of a second time interval, the reset circuit allows the current limiter to operate again to limit the current supplied from the driver circuit to the load.

In another aspect, a method is provided for controlling a driver circuit driving a load. According to the method, during normal operation a driver circuit supplies a normal load current to the load. The method detects whether a fault exists across the load and in response to detecting a fault, limits the load current to a limited current value for a first time interval. After the first time interval expires, the load current is allowed to exceed the limited current value for a second time interval. If the fault is still being detected after the second time interval, then the load current is once again limited to the limited current value.

In yet another aspect, a current limiting controller for a driver circuit includes a fault detector to detect a fault across a load that is being driven by the driver circuit. A current limiter limits the current supplied from the driver circuit to the load in response to a detected fault. A reset circuit disables the current limiter upon expiration of a first time interval after the fault is detected. The reset circuit allows the current limiter once again to limit the current supplied from the driver circuit to the load if the fault is still detected after expiration of a second time interval.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

As mentioned above, it is desirable to detect any kind of short circuit or fault that occurs across a light emitting diode (LED) load that is controlled by a driver. Furthermore, in the event that such a short circuit or fault occurs, it is desirable to limit the current supplied by the driver to the load to a lower, safe, value that will not cause damage or create a hazard.

Furthermore, the inventor has recognized and appreciated that, in many cases, the cause of a short circuit or fault is only temporary and after a period of time the short circuit disappears or is eliminated. The inventor has therefore appreciated that it would be beneficial to be able to automatically reset the driver to normal operation after the elimination of a fault.

In view of the foregoing, various embodiments and implementations of the present invention are directed to a current limiting controller for a driver circuit for an LED load that can reset the driver to normal operation when a short circuit or fault is eliminated or disappears.

Figure 1:
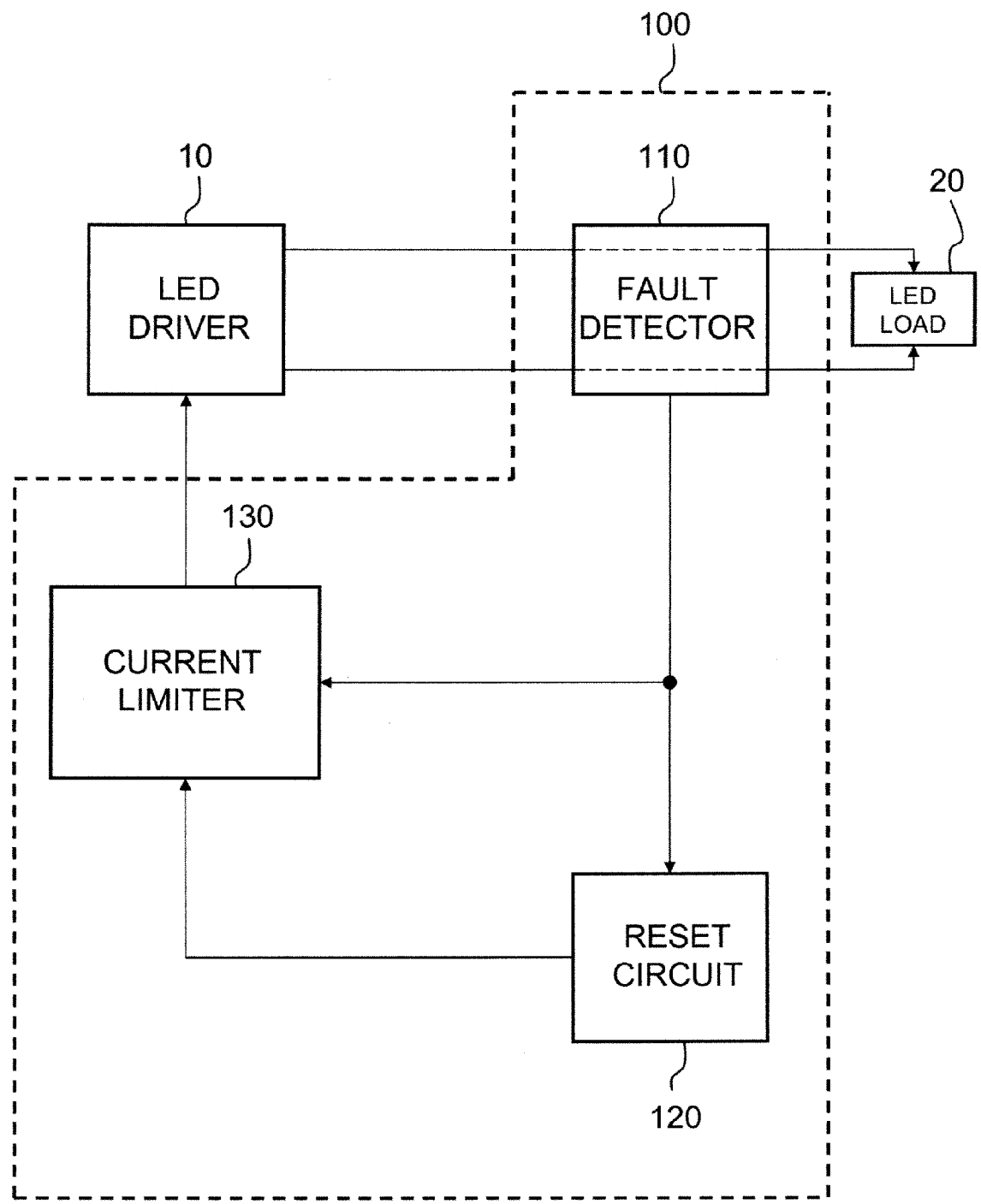
FIG. 1 illustrates a functional block diagram of one embodiment of a current limiting controller for a light emitting diode (LED) driver.

FIG. 1 illustrates a functional block diagram of one embodiment of a current limiting controller 100 for an LED driver 10 driving an LED load 20. Current limiting controller 100 includes a fault detector 110, a reset circuit 120, and a current limiter 130. In operation, the LED driver supplies a load current to the LED load that includes one or more LEDs illuminated in response to the load current supplied thereto by the LED driver.

Fault detector 110 detects whether or not a fault (e.g., a short circuit) exists across the LED load 20. So long as the fault detector does not detect a fault across the LED load, the LED driver 10 supplies a normal load current to the LED load. When the fault detector detects a fault at the LED load, it supplies a fault detection signal to current limiter 130 indicating that a fault has been detected. In response to the fault detection signal indicating that a fault has been detected, the current limiter operates to limit the load current supplied from the LED driver to LED load to a limited load current value that is less than the normal load current value. Preferably, the limited load current value is a value that will not cause damage to the area where the fault exists, or create a hazardous or dangerous condition.

In some embodiments, the fault detector also supplies a signal to reset circuit 120 indicating that a fault has been detected. After the fault us detected, the reset circuit allows the current limiter to limit the load current supplied by the LED driver to the LED load for a first time interval. Upon expiration of the first time interval, the reset circuit disables the current limiter. That is, after the first time interval expires, the LED driver once again supplies the normal operating current to the LED load for at least a second time interval. During this time, the fault detector continues to detect whether or not the fault still exists across the LED load. If the fault detector continues to detect a fault at the LED load upon expiration of the second time interval, the reset circuit allows the current limiter once again to limit the current supplied from the LED driver to the LED load.

So long as the fault detector continues to detect a fault across LED load, reset circuit continuously cycles between limiting the load current to the limited current value for a first time period corresponding to the first time interval, and allowing the load current to exceed the limited current value for a second time period corresponding to the second time interval.

Figure 2:
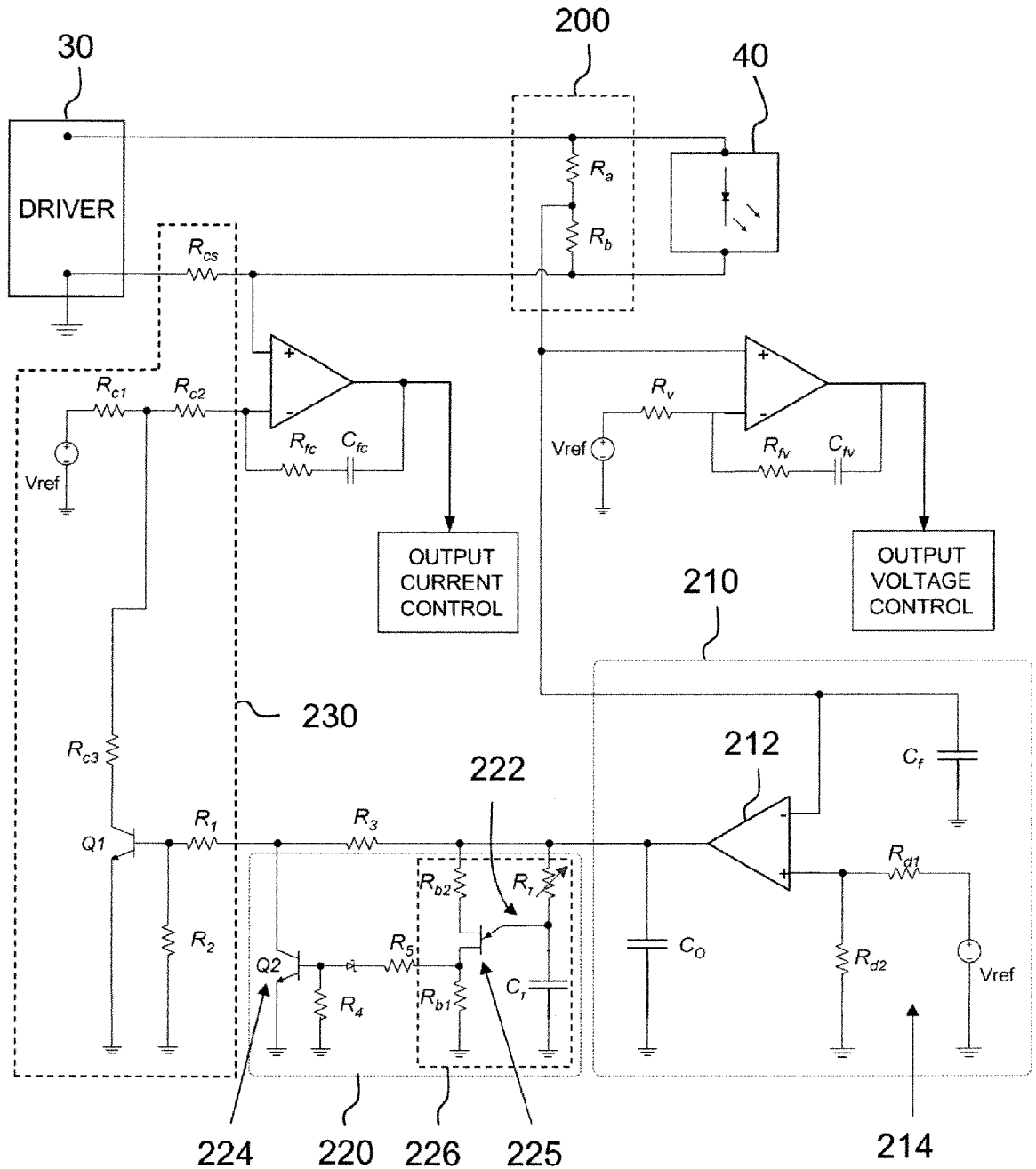
FIG. 2 illustrates a schematic diagram of one embodiment of a current limiting controller for a driver supplying a current to a load.

FIG. 2 illustrates a schematic diagram of one embodiment of a current limiting controller for a driver circuit 30 supplying a current to a load 40. Referring to FIG. 2, the circuit includes output current control element 50, an output voltage control element 60, a load voltage sampler 200, a voltage detector 210, a current limiter 220, and a reset circuit 230. The voltage detector includes a threshold voltage generator 212 supplying a threshold voltage, and an amplifier 214. Threshold voltage generator 212 includes a reference voltage input receiving a reference voltage Vref, and a resistor divider network to divide the reference voltage by a selected ratio to produce a threshold voltage. The current limiter 220 includes a transistor Q1 whose gate receives the output signal of the voltage detector 210. The reset circuit 230 includes a relaxation oscillator 226 and a switch 224 configured as a transistor Q1. Relaxation oscillator 226 includes a delay circuit 222 and a unijunction transistor (UJT) 225.

Operationally, in man embodiments, output voltage control element 60 regulates the DC output voltage of driver 30 until the output current reaches its normal value. At this point, output current control element 50 takes over and driver 30 goes into a current mode control. In the current mode control, the output current of the driver is regulated regardless of the value of the output voltage. To detect a fault across load 40, load voltage sampler 200 produces a fault detection voltage based on the voltage produced across the load by the driver circuit.

Amplifier 214 has a first (non-inverting) terminal receiving the threshold voltage, a second (inverting) terminal receiving the fault detection voltage from load voltage sampler 200, and an output terminal supplying an output signal indicating whether the fault detection voltage is less than the threshold voltage.

The voltage detector 210 operates with load voltage sampler 200 to detect whether the output voltage across load 40 drops below a certain value (e.g., 30% of the nominal DC output voltage), indicating the presence of a fault (e.g., a short circuit at load 40). The output voltage across load 40 that triggers fault detection ($V_{set}$) is adjusted according the following equation:

$$V_{set} = V_{REF} * \frac{R_b}{R_a + R_b} * \frac{R_{d2}}{R_{d1} + R_{d2}} \quad (1)$$

As seen in equation (1), $R_{d1}$ and $R_{d2}$ can be adjusted to select the desired voltage threshold for detecting a fault.

Once the fault detection voltage goes below $V_{set}$, amplifier 214 of voltage detector 210 will output the output signal (e.g., a high voltage) indicating the detection of the fault. This will turn on the transistor Q1 in current limiter 230 to pull the voltage at the inverting terminal of the output current control circuit 50 to a low value. This in turn will cause the load current from driver 30 to be reduced to a limited load current value, $I_{set}$, according to the following equation:

$$I_{set} = V_{ref} * \frac{R_{C3}}{R_{C1} + R_{C3}} * \frac{1}{R_{CS}} \quad (2)$$

As seen in equation (2), $R_{C1}$ and $R_{C3}$ can be adjusted to select the desired limited load current value $I_{set}$.

The output current of driver 30 supplied to load 40 will remain at the limited load current value $I_{set}$ as long as Q1 in current limiter 230 remains on. In various embodiments, the reset circuit 220 is provided to allow the driver to resume providing the normal operating current to the load after a certain time interval in case the fault is eliminated or disappears. The reset circuit comprises switch 224 (transistor Q2) and relaxation oscillator 226, including delay circuit 222 and unijunction transistor 225. When the output voltage of voltage detector 210 increases, indicating that a fault has been detected across the load, relaxation oscillator 226 will charge up the voltage on the emitter of unijunction transistor 225 during a first time interval, T1. T1 can be selected by choosing appropriate values for the components $R_\tau$ and $C_\tau$ in delay circuit 222. When the emitter of unijunction transistor 225 reaches its firing threshold, then unijunction transistor 225 will start conducting, When the unijunction transistor starts conducting, this will turn on switch 224, which then turns off transistor Q1, disabling current limiter 230. Once transistor Q1 turns off, driver 30 will once again deliver the full, normal load current to load 40 for a second time interval T2 while the emitter voltage of unijunction transistor 225 discharges, at which point the unijunction transistor once again turns off. Beneficially, second time interval T2 is significantly shorter than first time interval T1.

At the end of time interval T2, when the unijunction transistor is again not conducting, then if the fault has been cleared or disappears, the output signal of the amplifier will go to a low voltage, keeping transistor Q1 off, and allowing driver 30 to continue to deliver the normal pre-fault load current to the load. Otherwise, if voltage detector 210 still detects that the output voltage across load 40 is less than $V_{set}$, indicating that the fault remains, then the output signal of amplifier 214 will remain at a high voltage so as to turn on transistor Q1, and the output current of driver will once again be limited to the limited load current value, $I_{set}$. The relaxation oscillator will repeat the process of periodically turning on switch 224 to disable the current limiter 230 after each subsequent first time period T1, and then turning off switch 224 to re-enable current limiter 230 after each subsequent second time period T2, until and unless the fault is no longer detected.

To avoid generating a current limiting pulse from the reset circuit during normal operation, the reset circuit 220 is supplied directly from the output of voltage detection circuit 210. Additionally, to avoid any false trigger of switch 224 (transistor Q2) during the valley period of unijunction transistor 225, a Zener diode Z (e.g., 1.9V) is connected between the relaxation oscillator 226 and the control terminal (gate) of switch 224 (transistor Q2). Beneficially, zener diode Z removes the effect of the valley voltage of unijunction transistor 225 on the triggering of switch 224.

Figure 3:
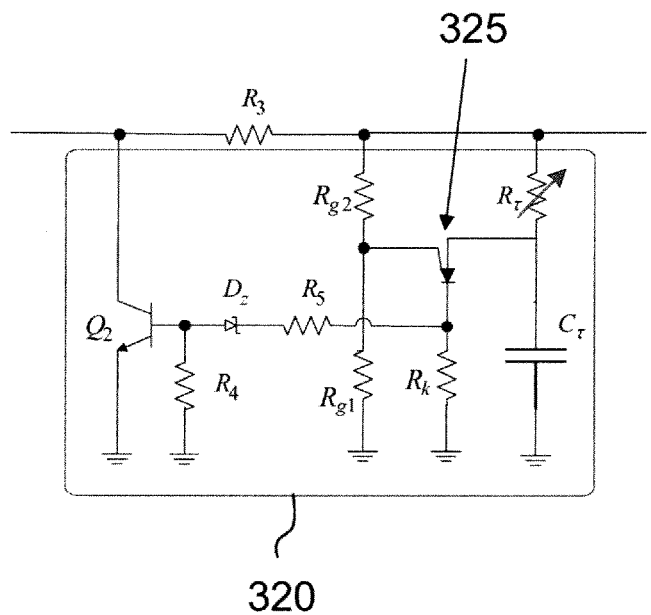
FIG. 3 illustrates one embodiment of a reset circuit for a current limiting controller for a driver.

FIG. 3 illustrates another embodiment of a reset circuit 320 for a current limiting controller for a driver. Reset circuit 320 differs from reset circuit 220 principally in that reset circuit 32o employs a programmable unijunction transistor (PUT) 325 in place of the "regular" unijunction transistor 225 of reset circuit 220.

Figure 4:
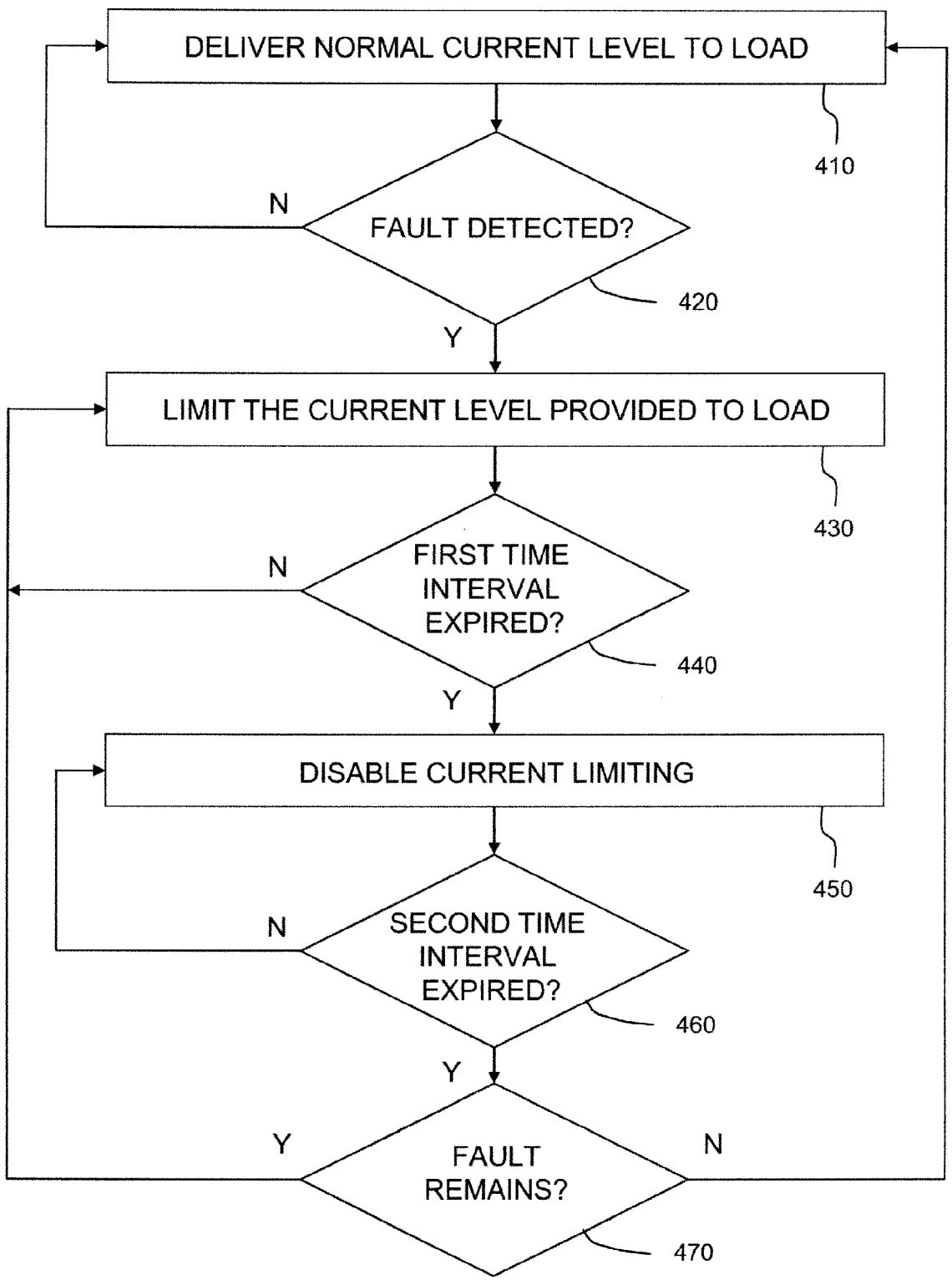
FIG. 4 is a flowchart illustrating one embodiment of a process of controlling a driver to supply a current to a load.

FIG. 4 is a flowchart illustrating one embodiment of a process 400 of controlling a driver to supply a load current to a load. In a first step 410, the driver delivers a normal load current to the load. While delivering the load current to the load, in a step 420 it is determined whether or a not a fault is detected. If no fault is detected, then the process continues delivering the normal load current to the load and determining whether or a not a fault is detected. If a fault is detected in step 420, then in a step 430 the current level of the load current provided from the driver to the load is limited to a current limited value.

In step 440, if a first time interval has not yet expired after the current delivered to the load was limited, then the current level of the load current provided from the driver to the load remains limited to the current limited value in step 430.

Once the first time interval has expired, then in a step 450, current limiting is disabled and the current level of the load current provided from the driver to the load returns again to the normal, pre-fault value. In step 460, if a second time interval has not yet expired after the current limiting was disabled, then the current limiting remains disabled in step 450. Once the second time interval has expired, then in a step 470, it is determined if the fault remains. If the fault remains, then the load current is again limited at step 430 and the process repeats from there. However, if the fault remains, then the load current is again restored to the normal, pre-fault, level.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A current limiting controller for a driver circuit, the current limiting controller comprising:
   a voltage detector for detecting a fault detection voltage corresponding to a voltage produced across a load by the driver circuit;
   a current limiter for limiting a current supplied from the driver circuit to the load in response to the fault detection voltage falling below a threshold value;
   a reset circuit for disabling the current limiter upon expiration of a first time interval after the fault detection voltage falls below the threshold voltage level, the reset circuit allowing the current limiter to limit the current supplied from the driver circuit to the load when the fault detection voltage remains below the threshold voltage after a second time interval, wherein the reset circuit comprises:
   a delay circuit configured to set the first time interval;
   a switch having a first state and a second state, the switch being configured in the first state to disable the current limiter, and being configured in the second state to allow the current limiter to respond to the fault detection voltage; and
   a unijunction transistor configured to set the switch into the first state when the first time interval expires, and to set the switch into the second state when the second time interval expires.

2. The current limiting controller of claim 1, wherein the voltage detector comprises:
   a threshold voltage generator supplying a threshold voltage; and an amplifier having a first terminal adapted to receive the threshold voltage, a second terminal adapted to receive the fault detection voltage, and an output terminal adapted to supply an output signal indicating whether the fault detection voltage is less than the threshold voltage.

3. The current limiting controller of claim 2, wherein the threshold voltage generator comprises:
a reference voltage input adapted to receive a reference voltage; and
a divider network to divide the reference voltage by a selected ratio to supply the threshold voltage.

4. The current limiting controller of claim 2, wherein the current limiter comprises a transistor having a control terminal adapted to receive the output signal of the voltage detector and in response thereto to selectively limit the current supplied from the driver circuit to the load.

5. The current limiting controller of claim 1, wherein the reset circuit comprises a relaxation oscillator.

6. The current limiting controller of claim 1, wherein the unijunction transistor is a programmable unijunction transistor.

7. The current limiting controller of claim 1, wherein, so long as the fault detection voltage remains below the threshold voltage level, the reset circuit continuously cycles between allowing the current limiter to limit the current supplied from the driver circuit to the load for a first time period corresponding to the first time interval, and disabling the current limiter for a second time period corresponding to the second time interval.

8. A method of controlling a driver circuit driving a load, the method comprising:
supplying a load current from a driver circuit to a load;
detecting a fault across the load;
in response to the detected fault, limiting the load current to a limited current value and charging an emitter voltage of a unijunction transistor for a first time interval;
upon expiration of the first time interval, conducting current through the unijunction transistor for a second time interval to disable the limiting of the load current, allowing the load current to exceed the limited current value for the second time interval;
turning off the unijunction transistor at the end of the second time interval and detecting whether the fault remains after the second time interval; and
in response to the fault still being detected after the second time interval, once again limiting the load current to the limited current value.

9. The method of claim 8, further comprising, so long as the fault is still being detected, continuously cycling between limiting the load current to the limited current value for a first time period corresponding to the first time interval, and allowing the load current to exceed the limited current value for a second time period corresponding to the second time interval.

10. The method of claim 8, wherein detecting a fault at the load comprises:
generating a fault detection voltage corresponding to a voltage produced across the load by the driver circuit;
producing a threshold voltage;
comparing the fault detection voltage to the threshold voltage; and
producing an output signal indicating whether the fault detection voltage is less than the threshold voltage.

11. The method of claim 10, wherein producing a threshold voltage comprises:
receiving a reference voltage; and
dividing the reference voltage by a selected ratio to produce the threshold voltage.

12. The method of claim 8, further comprising
selecting resistor and capacitor values in a relaxation oscillator to set the first time interval.

13. A current limiting controller for a driver circuit, the current limiting controller comprising:
a fault detector for detecting a fault at a load that is being driven by the driver circuit;
a current limiter for limiting a current supplied from the driver circuit to the load in response to the detected fault;
a reset circuit for disabling the current limiter upon expiration of a first time interval after the fault is detected, the reset circuit adapted to allow the current limiter again to limit the current supplied from the driver circuit to the load the detected fault remains after a second time interval, wherein the reset circuit comprises:
a delay circuit configured to set the first time interval;
a switch having a first state and a second state, the switch being configured in the first state to disable the current limiter, and being configured in the second state to allow the current limiter to respond to the fault detection voltage; and
a unijunction transistor configured to set the switch into the first state when the first time interval expires, and to set the switch into the second state when the second time interval expires.

14. The current limiting controller of claim 13, wherein the fault detector comprises:
a threshold voltage generator supplying a threshold voltage; and
an amplifier having a first terminal adapted to receive the threshold voltage, a second terminal adapted to receive a fault detection voltage corresponding a voltage produced across the load by the driver circuit, and an output terminal adapted to supply an output signal indicating whether the fault is detected.

15. The current limiting controller of claim 14, wherein the current limiter comprises a transistor having a control terminal adapted to receive the output signal of the fault detector and in response thereto to selectively limit the current supplied from the driver circuit to the load.

16. The current limiting controller of claim 13, wherein the reset circuit comprises a relaxation oscillator.

17. The current limiting controller of claim 13, wherein the unijunction transistor is a programmable unijunction transistor.

18. The current limiting controller of claim 13, wherein, so long as the fault is detected, the reset circuit continuously cycles between allowing the current limiter to limit the current supplied from the driver circuit to the load for a first time period corresponding to the first time interval, and disabling the current limiter for a second time period corresponding to the second time interval.

* * * * *